United States Patent
Penev

(10) Patent No.: US 6,881,508 B2
(45) Date of Patent: Apr. 19, 2005

(54) APPARATUS AND METHOD FOR CONTROLLING A FUEL CELL SYSTEM

(75) Inventor: Mihail M. Penev, Clifton Park, NY (US)

(73) Assignee: Plug Power, Inc., Latham, NY (US)

( * ) Notice: Subject to any disclaimer, the term of this patent is extended or adjusted under 35 U.S.C. 154(b) by 442 days.

(21) Appl. No.: 10/158,177

(22) Filed: May 30, 2002

(65) Prior Publication Data

US 2003/0224231 A1 Dec. 4, 2003

(51) Int. Cl.$^7$ ................................ H01M 8/04
(52) U.S. Cl. ..................... 429/17; 429/13; 429/19; 429/22; 429/23; 429/24; 429/26; 429/21; 429/32
(58) Field of Search ............... 429/13, 17, 19, 429/21, 22, 23, 24, 26, 32

(56) References Cited

U.S. PATENT DOCUMENTS

| | | | |
|---|---|---|---|
| 6,370,878 B1 * | 4/2002 | Dean et al. ............. | 60/649 |
| 6,379,826 B1 * | 4/2002 | Lacy ..................... | 429/13 |
| 6,436,561 B1 * | 8/2002 | Hart-Predmore et al. ..... | 429/12 |
| 6,551,733 B1 * | 4/2003 | Peschke et al. ............ | 429/24 |
| 6,686,078 B1 * | 2/2004 | Jones .................... | 429/17 |
| 6,740,437 B1 * | 5/2004 | Ballantine et al. ......... | 429/23 |
| 6,777,123 B1 * | 8/2004 | Okamoto ................. | 429/24 |
| 6,815,101 B1 * | 11/2004 | de Vaal et al. ............ | 429/13 |

* cited by examiner

Primary Examiner—Bruce F. Bell
(74) Attorney, Agent, or Firm—Trop, Pruner & Hu, P.C.

(57) ABSTRACT

The invention provides integrated fuel cell systems and associated operating methods wherein oxidant flow is controlled in response to an oxygen sensor in an exhaust stream of a fuel cell exhaust gas oxidizer, and fuel flow is controlled in response to a temperature measurement associated with the oxidizer.

40 Claims, 2 Drawing Sheets

APPARATUS AND METHOD FOR CONTROLLING A FUEL CELL SYSTEM

BACKGROUND

The invention generally relates to an apparatus and method for controlling a fuel cell system.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

$$H_2 \rightarrow 2H^+ + 2e^- \text{ at the anode of the cell} \quad (1)$$

$$O_2 + 4H^+ + 4e^- \rightarrow 2H_2O \text{ at the cathode of the cell} \quad (2)$$

A typical fuel cell has a terminal voltage of up to one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow plates (graphite composite or metal plates, as examples) that are stacked one on top of the other. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells. Electrically conductive gas diffusion layers (GDLs) may be located on each side of each PEM to act as a gas diffusion media and in some cases to provide a support for the fuel cell catalysts. In this manner, reactant gases from each side of the PEM may pass along the flow channels and diffuse through the GDLs to reach the PEM. The PEM and its adjacent pair are often assembled together in an arrangement called a membrane electrode assembly (MEA).

A fuel cell system may include a fuel processor that converts a hydrocarbon (natural gas or propane, as examples) into a fuel flow for the fuel cell stack. Exemplary fuel processor systems are described in U.S. Pat. Nos. 6,207,122, 6,190,623, 6,132,689, which are hereby incorporated by reference.

The two reactions which are generally used to convert a hydrocarbon fuel into hydrogen are shown in equations (3) and (4).

$$\tfrac{1}{2}O_2 + CH_4 \rightarrow 2H_2 + CO \quad (3)$$

$$H_2O + CH_4 \rightarrow 3H_2 + CO \quad (4)$$

The reaction shown in equation (3) is sometimes referred to as catalytic partial oxidation (CPO). The reaction shown in equation (4) is generally referred to as steam reforming. Both reactions may be conducted at a temperature from about 600–1,100° C. in the presence of a catalyst such as platinum. A fuel processor may use either of these reactions separately, or both in combination. While the CPO reaction is exothermic, the steam reforming reaction is endothermic. Reactors utilizing both reactions to maintain a relative heat balance are sometimes referred to as autothermal (ATR) reactors. It should be noted that fuel processors are sometimes generically referred to as reformers, and the fuel processor output gas is sometimes generically referred to as reformate, without respect to which reaction is employed.

As evident from equations (3) and (4), both reactions produce carbon monoxide (CO). Such CO is generally present in amounts greater than 10,000 parts per million (ppm). Because of the high temperature at which the fuel processor is operated, this CO generally does not affect the catalysts in the fuel processor. However, if this reformate is passed to a prior art fuel cell system operating at a lower temperature (e.g., less than 100° C.), the CO may poison the catalysts in the fuel cell by binding to catalyst sites, inhibiting the hydrogen in the cell from reacting. In such systems it is typically necessary to reduce CO levels to less than 100 ppm to avoid damaging the fuel cell catalyst. For this reason the fuel processor may employ additional reactions and processes to reduce the CO that is produced. For example, two additional reactions that may be used to accomplish this objective are shown in equations (5) and (6). The reaction shown in equation (5) is generally referred to as the shift reaction, and the reaction shown in equation (6) is generally referred to as preferential oxidation (PROX).

$$CO + H_2O \rightarrow H_2 + CO_2 \quad (5)$$

$$CO + \tfrac{1}{2}O_2 \rightarrow CO_2 \quad (6)$$

Various catalysts and operating conditions are known for accomplishing the shift reaction. For example, the reaction may be conducted at a temperature from about 300–600° C. in the presence of supported platinum. Other catalysts and operating conditions are also known. Such systems operating in this temperature range are typically referred to as high temperature shift (HTS) systems. The shift reaction may also be conducted at lower temperatures such as 100–300° C. in the presence of other catalysts such as copper supported on transition metal oxides. Such systems operating in this temperature range are typically referred to as low temperature shift (LTS) systems. Other catalysts and operating conditions are also known. In a practical sense, typically the shift reaction may be used to lower CO levels to about 1,000–10,000 ppm, although as an equilibrium reaction it may be theoretically possible to drive CO levels even lower.

The PROX reaction may also be used to further reduce CO. The PROX reaction is generally conducted at lower temperatures than the shift reaction, such as 70–200° C. Like the CPO reaction, the PROX reaction can also be conducted in the presence of an oxidation catalyst such as platinum. The PROX reaction can typically achieve CO levels less than 100 ppm (e.g., less than 50 ppm).

In general, fuel cell power output is increased by raising fuel and air flow to the fuel cell in proportion to the stoichiometric ratios dictated by the equations listed above. Thus, a controller of the fuel cell system may monitor the output power of the stack and based on the monitored output power, estimate the fuel and air flows required to satisfy the power demand. In this manner, the controller regulates the fuel processor to produce this flow, and in response to the controller detecting a change in the output power, the controller estimates a new rate of fuel flow and controls the fuel processor accordingly.

The ratio of fuel or air provided to a fuel cell in relation to what is theoretically required by a given power demand is sometimes referred to as "stoich". For example, 1 anode stoich refers to 100% of the hydrogen theoretically required to meet a given power demand, whereas 1.2 stoich refers to 20% excess hydrogen over what is theoretically required. Since in real conditions it is typical that not all of the hydrogen or air supplied to a fuel cell will actually react, it may be desirable to supply excess fuel and air to meet a give power demand.

The fuel cell system may provide power to a load, such as a load that is formed from residential appliances and electrical devices that may be selectively turned on and off to vary the power that is demanded. Thus, in some applications the load may not be constant, but rather the power that is consumed by the load may vary over time and change abruptly. For example, if the fuel cell system provides power to a house, different appliances/electrical devices of the house may be turned on and off at different times to cause the load to vary in a stepwise fashion over time.

Typically, spent anode and cathode streams are exhausted from a fuel cell stack and vented to ambient. Generally, not all of the hydrogen in the anode stream will have reacted in the fuel cell stack, and the anode exhaust stream will also contain levels of carbon monoxide and residual hydrocarbons from the fuel processor. Accordingly, the exhaust streams are usually passed through a burner or catalytic converter to remove these components. In some systems, heat is recovered from this oxidation that can be used elsewhere in the system (e.g., to make steam for use in the fuel processor or to humidify the air stream fed to the fuel cell stack).

The burner or catalytic converter used to oxidize the exhaust streams can be generally referred to as an oxidizer, or an "anode tailgas oxidizer" (also referred to as an "ATO"). In some cases, anode and cathode exhaust streams are combined prior to entering an ATO. An ATO may also be supplied with a variable amount of ambient air to ensure there is adequate oxygen to oxidize components of the anode exhaust stream. Designs utilizing a catalytic converter (e.g., platinum-based monoliths similar to automotive catalytic converters) sometimes further include a mechanism for regulating the temperature of the catalyst to avoid overheating (e.g., the catalyst can be damaged at temperatures over 1000° C.

There is a continuing need for integrated fuel cell systems designed to achieve objectives including the forgoing in a robust, cost-effective manner.

SUMMARY

The invention provides integrated fuel cell systems and associated operating methods where oxidant flow is controlled in response to an oxygen sensor in an exhaust stream of a fuel cell exhaust gas oxidizer, and fuel flow is controlled in response to a temperature measurement associated with the oxidizer. For illustration, the discussion provided herein focuses on PEM systems. However, the present invention can also apply to various other types of fuel cell systems, including solid oxide, phosphoric acid, molten carbonate, etc.

In one embodiment, the invention provides a fuel cell system including a fuel processing reactor adapted to receive a flow of fuel from a fuel source. The fuel processing reactor is further adapted to react the flow of fuel and provide reformate to an anode of a fuel cell stack. An air source is adapted to provide a flow of air to a cathode of the fuel cell stack. An oxidizer is adapted to receive and oxidize a flow of reformate from the anode of the fuel cell stack, via oxygen from a flow of air from the cathode of the fuel cell stack. An oxygen sensor is adapted receive or contact an exhaust flow from the oxidizer, and the oxygen sensor is further adapted to indicate a level of oxygen in the exhaust flow. A temperature sensor is provided to measure a temperature of the oxidizer. A controller is connected to the fuel source and the temperature sensor, and the controller is adapted to vary an output of the fuel source in response to a change in a signal received from the temperature sensor. The controller is further connected to the air source and the oxygen sensor, and adapted to vary an output of the air source in response to a change in a signal received from the oxygen sensor.

One advantage provided is that the fuel flow to the fuel processor can be controlled without the need for a flow sensor. Such sensors are generally expensive, and may need to be continually calibrated if the fuel composition fed to the fuel processor (e.g., natural gas from a utility) varies. Another advantage is that air flow in the system can also be controlled without the need for a flow sensor.

Various embodiments can include any of the following features, either alone or in combination.

A heat exchanger can be provided that is adapted to transfer heat from an exhaust of the oxidizer to a receiving stream. The heat exchanger can be configured to transfer heat from the exhaust of the oxidizer to liquid water to generate steam. As an example, the steam can be injected into the fuel processing reactor as required. The controller can modulate the air source in response to the oxygen sensor to maintain a molar oxygen fraction in the cathode exhaust stream in the range 0.0–0.1.

The oxidizer temperature is generally increased by increasing the fuel flow to the fuel cell for a given electrical load (resulting in excess fuel in the fuel cell exhaust), or by decreasing the electrical load on the fuel cell for a given rate of fuel flow (again resulting in excess fuel in the fuel cell exhaust). Conversely, the oxidizer temperature is generally decreased by decreasing the fuel flow to the fuel cell for a given electrical load, or by increasing the electrical load on the fuel cell for a given rate of fuel flow.

The oxygen content of the oxidizer exhaust is generally increased by increasing the flow of air to the oxidizer, or by decreasing the flow of fuel to the oxidizer. Conversely, the oxygen content of the oxidizer exhaust is generally decreased by decreasing the flow of air to the oxidizer, or by increasing the flow of fuel to the oxidizer.

The controller can modulate the fuel source to maintain the oxidizer temperature below a predetermined level (e.g., less than 1,000° C., or less than 500° C., as examples). In some embodiments, the controller can be further configured to modulate the fuel source to maintain the oxidizer temperature less than 400° C. (or some other amount) greater than the outlet temperature of the fuel cell stack. In some embodiments, the controller can modulate an electrical load on the fuel cell to control the oxidizer temperature (e.g., raising the load to lower the oxidizer temperature and vice-versa).

In some embodiments, systems may include a voltage sensor adapted to measure a voltage of at least one fuel cell in the fuel cell stack. The controller can modulate the flow of fuel from the fuel source to maintain the voltage above a predetermined level. As examples, the oxidizer temperature can be an oxidizer exhaust temperature, or a monolith temperature. Systems may also include a current sensor to measure a current produced by the fuel cell stack. In such embodiments, the controller can modulate the flow of fuel from the fuel source in response to a signal from the current sensor (e.g., to increase fuel flow as current output increases).

The flow of air from the cathode of the fuel cell stack can be injected into the oxidizer. The oxygen sensor can be located along an exhaust conduit connected to an outlet of the oxidizer.

In some embodiments, the air source is a variable speed blower, such as a fan or compressor. Likewise, in some embodiments, the fuel source can also be a variable speed blower. The air source can also be a pressure vessel, such as an oxygen tank, having a variable flow actuator (e.g., a pressure regulator) to control flow to the fuel cell. As an example, the flow actuator can be coupled to a controller for automated control. The fuel source can also be such a system (e.g., a hydrogen tank with an automatic flow actuator to control flow). In still other embodiments, systems can be provided with a pressure vessel-driven fuel source and a blower-driven oxidant source, and vice-versa.

In a related aspect, the invention provides a method of operating a fuel cell system, including the following steps:

modulating an air blower according to a first control signal to flow air through a cathode of a fuel cell;

modulating a fuel blower according to a second control signal to flow fuel through a fuel processing reactor to produce reformate, the fuel blower further motivating flow of the reformate from the fuel processing reactor to an anode of a fuel cell;

combining air exhausted from the fuel cell cathode with reformate exhausted from the fuel cell anode to form a combined stream, and flowing the combined stream through an oxidizer;

operating an oxygen sensor to measure an amount of oxygen in an oxidizer exhaust, and communicating an oxygen signal to a controller;

operating the controller in response to the oxygen signal to increase an output of the air blower to maintain an oxygen fraction of the oxidizer exhaust above a predetermined oxygen threshold;

operating a temperature sensor to measure an oxidizer temperature, and communicating a temperature signal to the controller; and operating the controller in response to the temperature signal to increase an output of the fuel blower to maintain the oxidizer temperature below a predetermined temperature threshold.

Various embodiments may further include any of the following additional steps or features, either alone or in combination.

The predetermined oxidizer temperature threshold can be 1000° C., as an example. The predetermined oxygen threshold can be a molar oxygen fraction in a predetermined range (e.g., 0.0–0.1).

Heat from the oxidizer can be transferred to liquid water to generate steam. The steam can be injected into the fuel processing reactor.

A voltage of the fuel cell can be measured to provide a voltage signal to the controller. The controller can be operated in response to the voltage signal to maintain the voltage of the fuel cell above a predetermined level.

The air exhausted from the fuel cell cathode can be combined with the reformate exhausted from the fuel cell anode to form a combined exhaust flow. The combined exhaust can be flowed into the oxidizer.

The air exhausted from the fuel cell cathode can be flowed through the oxidizer. The oxygen sensor can be located along an exhaust conduit connected to the oxidizer. The oxidizer temperature can be an oxidizer exhaust temperature or an oxidizer monolith temperature, as examples. The method may further include determining whether a power demand on the fuel cell is met by an output from the fuel cell. In addition, such methods may further include decreasing an output of the fuel source in order to lower the oxidizer temperature toward a predetermined level during a period where the power demand is met (the control loop associated with the oxidant flow and the oxygen sensor will adjust the oxidant stoich accordingly) oxygen sensor feedback. Alternatively, the output of the air source can also be decreased in order to lower the oxidizer temperature toward a predetermined level during a period where the power demand is met (the oxidizer temperature control will adjust the fuel stoich accordingly).

Related methods may further include and of the following steps, either alone or in combination: decreasing the flow of reformate from the fuel processor to increase the oxygen fraction of the oxidizer exhaust; increasing the flow of reformate from the fuel processor to decrease the oxygen fraction of the oxidizer exhaust; decreasing the flow of air through the cathode to decrease the oxidizer temperature; or increasing the flow of air through the cathode to increase the oxidizer temperature.

In another aspect, a method of operating a fuel cell system is provided including the following steps:

flowing a fuel flow through a first electrode of a fuel cell to an oxidizer;

modulating a rate of oxidant flow through a second electrode of the fuel cell in response to an oxygen sensor contacting an exhaust flow of the oxidizer; and modulating a rate of the fuel flow in response to a temperature sensor contacting the exhaust flow of the oxidizer.

In another aspect, a method of operating a fuel cell system is provided including the following steps:

flowing a fuel flow through a first electrode of a fuel cell to an oxidizer;

modulating a rate of first oxidant flow through a second electrode of the fuel cell in response to a first oxygen sensor contacting an exhaust flow of the oxidizer;

modulating a rate of the fuel flow in response to a temperature sensor contacting the exhaust flow of the oxidizer; and modulating a rate of second oxidant flow through the oxidixer in response to a second oxygen sensor contacting the exhaust flow of the oxidizer.

In another aspect, the invention provides a reactant flow rate controller for a fuel cell system. A fuel cell has an air electrode and a fuel electrode. For example, in a PEM system, the air electrode can refer to a cathode, and the fuel electrode can refer to an anode. An air blower is adapted to vary a flow of air through the air electrode of the fuel cell. A fuel blower is adapted to vary a flow of fuel through the fuel electrode of the fuel cell. An oxidizer is adapted to receive an exhaust flow from the fuel electrode of the fuel cell. The oxidizer is further adapted to receive an air flow, and to oxidize the exhaust flow from the fuel electrode to produce an oxidizer exhaust flow. A temperature sensor is adapted to measure an oxidizer temperature. An oxygen sensor is adapted to indicate a level of oxygen in the oxidizer exhaust flow. A controller is adapted to receive a temperature signal from the temperature sensor, and the controller is further adapted to receive an oxygen signal from the oxygen sensor. The controller is further adapted to modulate a first output of the air blower and a second output of the fuel blower.

Such a system can further include any of the features previously described, either alone or in combination. It will be appreciated that the terms "air electrode" and "fuel electrode" are used in this description since the invention covers multiple types of fuel cell systems, and since the paring of the terms "cathode" with oxidant and "anode" with fuel are reversed for solid oxide systems.

Advantages and other features of the invention will become apparent from the following description, drawing and claims.

DETAILED DESCRIPTION

Figure 1:
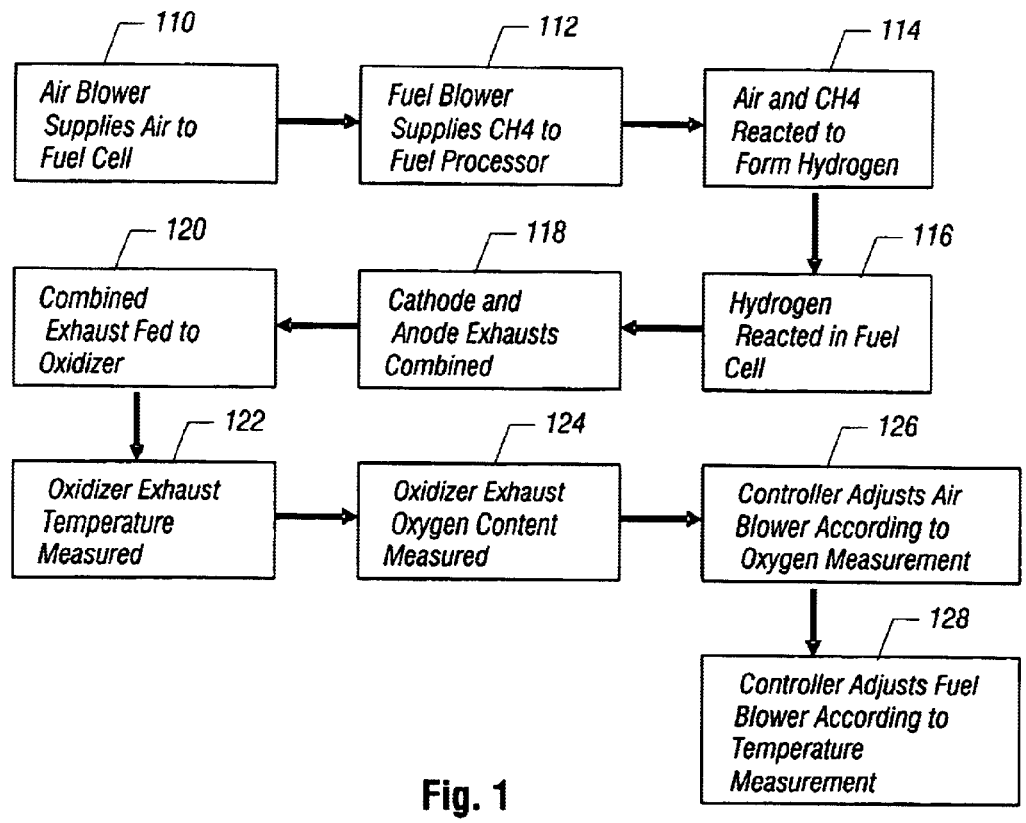
FIG. 1 shows a flow chart of a method of controlling an integrated fuel cell system.

Referring to FIG. 1, a flow chart is shown of a method for operating an integrated fuel cell system, including the following steps: (110) an air blower is operated to supply air to a fuel cell; (112) a fuel blower is operated to supply fuel (e.g., natural gas or methane) to a fuel processor; (114) air and fuel are reacted in the fuel processor to form reformate containing hydrogen; (116) hydrogen in the reformate is reacted in a fuel cell; (118) exhausts from the cathode and anode of the fuel cell are combined; (120) the combined exhaust is fed to an oxidizer; (122) the oxidizer exhaust temperature is measured (e.g., compared to the fuel cell temperature); (124) the oxygen content of the oxidizer exhaust is measured; (126) a controller adjusts the air blower according to the oxygen measurement of step (124); and (128) the controller adjusts the fuel blower according to the temperature measurement of step (122).

Figure 2:
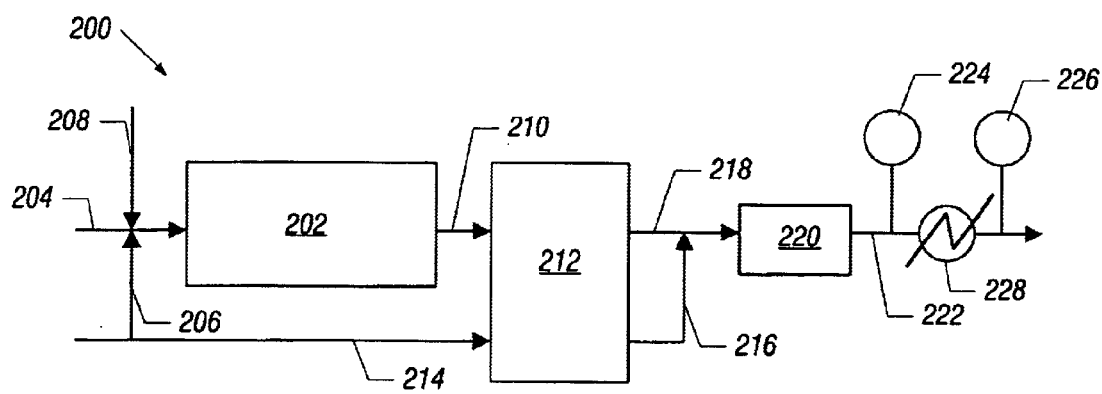
FIG. 2 shows a schematic diagram of a fuel cell system according to the present invention.

Referring to FIG. 2, a schematic diagram is shown of a fuel cell system 200 according to the present invention. A fuel processing reactor 202 (e.g., an autothermal reactor), receives a supply of fuel (e.g., natural gas) from conduit 204. A variable output fuel blower (not shown) is used to drive the fuel flow. Air is injected into the reactor 202 inlet via conduit 206. Steam is also injected into the reactor 202 inlet, via conduit 208. The fuel processing reactor 202 converts the fuel into reformate, which exits the fuel processor 202 via conduit 210 and is flowed through the fuel electrode chambers (not shown—e.g., anode chambers for a PEM fuel cell system) of a fuel cell stack 212. It will be appreciated that fuel processing reactor 202 can further include additional reactors (e.g., shift reactors) as previously described to minimize the CO in the reformate.

In the embodiment shown in FIG. 2, the fuel processor air conduit 206 is drawn from system air conduit 214. A variable output air blower (not shown) drives the air flow through conduits 206 and 214. As examples, the junction between conduits 214 and 206 can include an orifice or a valve to control the proportion of air flow sent through each conduit. Air conduit 214 is used to deliver air to fuel cell stack 212, where the air is flowed through the air electrode chambers of the stack (not shown—e.g., cathode chambers for a PEM fuel cell system). In other embodiments, conduit 206 is fed by its own air blower, in addition to the air blower supplying conduit-214 and responsive to sensors 224 and 226.

The spent fuel is exhausted from the fuel cell stack 212 via conduit 218. In the particular example shown, the air is exhausted from fuel cell stack via conduit 216 and is mixed with the fuel exhausted conduit 218. The combined exhaust is flowed through oxidizer 220. Oxidizer 220 can be a burner, or a catalytic converter, such as a platinum wash-coated ceramic monolith. In some embodiments, oxidizer 220 can receive the cathode exhaust directly, or can receive a supplemental flow of air to ensure there is adequate oxygen to oxidize any hydrogen, carbon monoxide or residual hydrocarbons in the anode exhaust. Other embodiments are possible.

In other embodiments, the conduit 216 can be routed elsewhere, such as to the inlet of fuel processor 202. In such systems, the oxidizer 220 may receive a stream of fresh air directly from an additional blower, made responsive to oxygen sensor 226. An additional oxygen sensor (not shown) on the cathode exhaust can be used to control the air blower supplying the fuel cell stack 212.

Exhaust gas exits the oxidizer 220 via conduit 218, which leads to heat exchanger 228, where heat from the oxidizer exhaust is transferred to a heat receiving fluid. For example, liquid water may be flowed through the heat exchanger to be converted to steam from the heat of the oxidizer exhaust. Such steam may be used in the fuel processing reactor (e.g., via conduit 208). The heat receiving fluid can also be fuel stream 204 in order to pre-heat the stream before injection into the reactor 202. Other embodiments are possible.

In the embodiment shown in FIG. 2, the oxygen content of the combined exhaust stream is measured by an oxygen sensor 226 at the oxidizer outlet. Suitable oxygen sensors are well known, such as those commonly used in automobiles. Other oxygen sensors are also suitable. The oxygen sensor 226 is connected to a controller (not shown) that is in turn connected to the variable speed blower driving the air flow through conduit 214. In some embodiments, the controller can be integrated into the air blower circuitry.

In general, the oxygen sensor 226 is used as an indicator of cathode stoichiometry (i.e., a measure of the sufficiency of oxygen flow through the cathode chambers of the fuel cell stack 212). As an example, it is generally desirable to provide excess oxygen to the fuel cell to accommodate transient load increases. As a further example, where the oxygen sensor 226 is calibrated to indicate molar oxygen fraction, it may be desirable to maintain the molar oxygen fraction is the cathode exhaust in a range from 0.0–0.1. It will be appreciated that maintaining an oxygen content in the oxidizer exhaust ensures not only that surplus oxygen is available in the fuel cell stack 212, but also that surplus oxygen is available in oxidizer 220 as needed to oxidize any combustible components in the system exhaust.

As an example, when oxygen sensor 226 indicates that the oxygen in the exhaust has fallen below a desired level, the system controller can dynamically increase the air flow through the system. Likewise, such feedback between the oxygen sensor 226 and the air blower can be used to lower the air blower output when the system power demand decreases. An advantage is thus provided in that a flow sensor or other means of measuring and controlling air flow is not needed to regulate cathode stoichiometry.

The temperature of the oxidizer exhaust is measured by temperature sensor 224 at the oxidizer exhaust. Suitable temperature sensors are well known such as common commercial thermocouples. Temperature sensor 224 is connected to a controller (not shown) that is in turn connected to the fuel blower driving the flow through conduit 204. In some embodiments, controller can be the same controller monitoring the oxygen sensor 226, or can also be integrated into the fuel blower circuitry.

Temperature sensor 224 can serve various functions under embodiments of the invention. For example, a system controller can monitor the temperature sensor 224 to ensure that the temperature of the oxidizer 220 (e.g., as indicated by a monolith temperature or by an exhaust temperature) does not exceed a desired value (e.g., that can result in damage to the oxidizer 220, such as 1000° C.). Temperature sensor 224 can also serve to indicate rises in oxidizer temperature. In some embodiments, a second temperature sensor (not shown) is connected to the stack and compared to the temperature sensor 224 to provide a measure of temperature rise from the fuel cell stack 212 to the outlet of oxidizer 220.

It will be appreciated that for a given stack current output and cathode stoichiometry, the oxidizer temperature and the gas temperature rise from the fuel cell exhaust to the oxidizer outlet is a function of anode stoichiometry, since greater amounts of excess hydrogen will produce greater amounts of heat and temperature rise associated with the oxidizer 220. As an example, a system can be calibrated such that a controller maintains the fuel blower in accordance with the temperature sensor 224. For example, for a fuel cell stack operated at a temperature of about 70–80° C., it may be desirable to provide excess hydrogen to the fuel cell stack 212 such that the temperature rise from the fuel cell stack 212 to the oxidizer outlet is in the range 250–350° C. As an example, when the temperature rise in the oxidizer 220 falls below this range, the controller connected to the sensor 224 can increase the fuel blower output to provide additional hydrogen to the fuel cell stack (e.g., with respect to a given load demand). Likewise, the controller can decrease the fuel blower output to maintain the excess anode stoichiometry below a desired level.

As previously indicated, the oxidizer temperature is generally increased by increasing the fuel flow to the fuel cell for a given electrical load (resulting in excess fuel in the fuel cell exhaust), or by decreasing the electrical load on the fuel cell for a given rate of fuel flow (again resulting in excess fuel in the fuel cell exhaust). Conversely, the oxidizer temperature is generally decreased by decreasing the fuel flow to the fuel cell for a given electrical load, or by increasing the electrical load on the fuel cell for a given rate of fuel flow. The oxygen content of the oxidizer exhaust is generally increased by increasing the flow of air to the oxidizer, or by decreasing the flow of fuel to the oxidizer. Conversely, the oxygen content of the oxidizer exhaust is generally decreased by decreasing the flow of air to the oxidizer, or by increasing the flow of fuel to the oxidizer.

In another example, a system controller can vary the flow of heat receiving fluid through heat exchanger 228 in response to temperature sensor 224. For example, an increase in blower speed generally also indicates a need for either greater steam flow to the fuel processing reactor 202, or more heat needed to preheat the incoming fuel 204, or both.

In still other embodiments, a voltage sensor can be adapted measure the voltage of fuel cell stack 212, or of at least one individual cell within fuel cell stack 212. It will be appreciated that as a fuel cell becomes reactant starved under given load, the cell voltage drops rapidly. Thus, voltage is a parameter commonly used to indicate reactant stoichiometry. In addition to the foregoing features and objectives, a system controller under the present invention may also be adapted to independently maintain the fuel cell stack voltage above a predetermined value (e.g., corresponding to 0.6 volts for a PEM system) by increasing the fuel and air blower speeds to supply excess reactants.

A current sensor may also be used to determine whether enough reactants are supplied for a given electrical load. For example, the output current of the fuel cell stack can be compared to an electrical load, and if the load is greater than the stack, either the reactant flow rates can be increased, or the load on the stack can be reduced (e.g., via a battery system, etc.). Such a comparison can be used by the controller to determine whether the air blower or fuel blower will be adjusted to adjust the temperature of the oxidizer and the oxygen content in the oxidizer exhaust. For example, as previously mentioned, if a greater oxidizer temperature is desired and the system is at close to 1 fuel stoich, it may be desirable to increase the air blower output rather than lower the fuel blower output, since in the latter case the system might not be able to meet the power demand.

Figure 3:
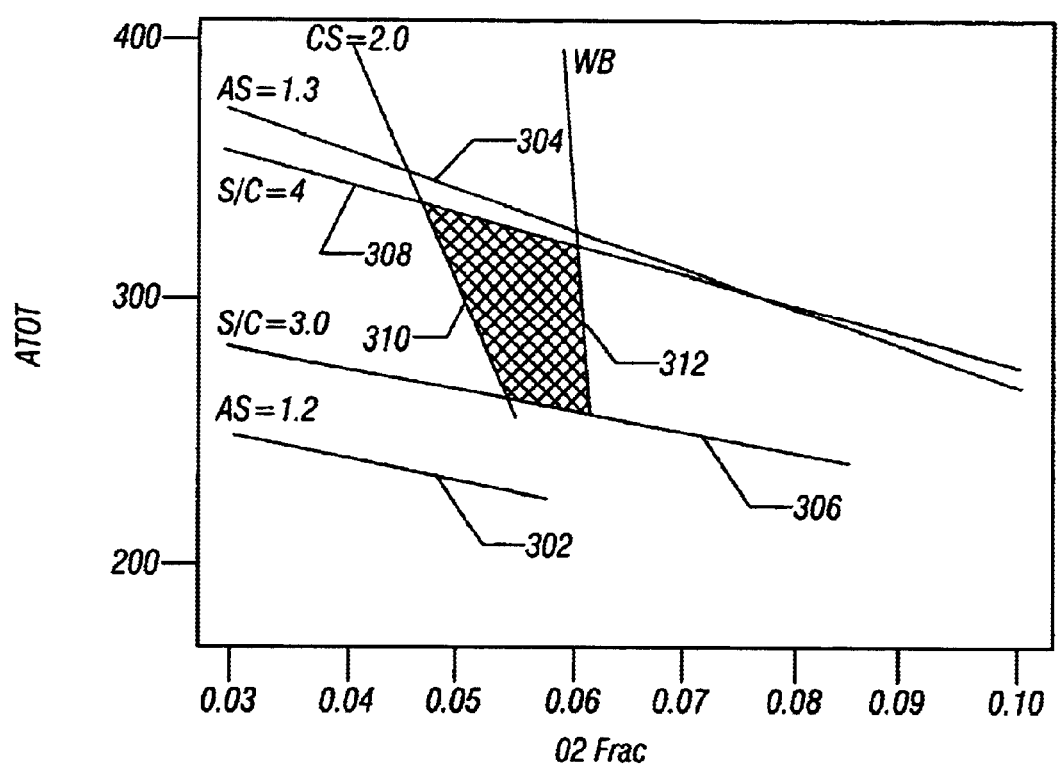
FIG. 3 shows a graph of operating latitude for a fuel cell system according to a possible embodiment of the present invention.

Referring to FIG. 3, a graph is shown of the operating latitude for a particular fuel cell system according to a possible embodiment of the present invention. It will be appreciated that the invention is not limited to the particular design represented by FIG. 3, rather, FIG. 3 is intended to illustrate that a system controller can be adapted to maintain a system under the present invention within a desired set of parameters. In this example, oxidizer temperature is plotted versus oxygen fraction in the oxidizer exhaust. Lines 302 and 304 refer to anode stoichiometries of 1.2 and 1.3, respectively. For example, it may be desirable to maintain a system in this range since higher anode stoichiometries are less efficient, and lower stoichiometries may not be adequate to accommodate typical transient load increases.

Lines 306 and 308 indicate anode stoichiometries (e.g., flow rates) necessary to achieve steam to carbon ratios in an autothermal fuel processing reactor of 3.0 and 4.0, respectively. As known in the art, the steam to carbon ratio refers to the molecules of steam reacted per molecules of carbon (or methane). As an example, levels higher than 4.0 require inefficient production of higher levels of steam, whereas levels much lower than 3.0 can result in carbon deposits in the reactor. Line 310 represents a cathode stoichiometry of 2.0, which in this case is a desired constant operating point for all power output ranges of the system. Line 312 represents cathode stoichiometry (e.g., flow rate) needed to achieve a water-balanced system.

A water balanced system refers to a system where the water potentially recoverable from the exhaust gasses is sufficient to sustain system operation such that water doesn't have to be added to the system from an outside blower during operation. The basis for the example shown in FIG. 3 is a 70–80° C. PEM system operating outside in a 35° C. environment, with heat removal from the oxidizer exhaust (see, e.g., heat exchanger 228 shown in FIG. 2) such that the exhaust vented to ambient has a temperature of about 40° C., where about 90% of the water condensed from the oxidizer exhaust is recovered by the system.

In the example shown in FIG. 3, it may be desirable to operate the system in the region defined by lines 306, 308, 310, and 312. At oxygen fractions greater than line 312, it may no longer be possible to achieve a water balanced system. This is because the greater oxygen fraction represents a higher oxidizer exhaust flow rate such that it may not be practical to cool the oxidizer exhaust to a point low enough to recover sufficient water (e.g., 40° C.). At oxygen fractions less than line 310, the system cannot operate because the cathode stoichiomtery is not high enough (e.g., in this particular system, 2 cathode stoich is designed to accommodate transient load increases of a particular system application).

At oxidizer temperatures greater than line 308, the system is operating inefficiently since the anode stoichiometry is higher than necessary, and excess heat is being generated in the oxidizer. Conversely, at oxidizer temperatures lower than line 306, the system cannot operate because not enough heat is being generated by the oxidizer to generate the steam required by the fuel processor, or in some cases, to ensure clean emissions since the oxidizer may require higher temperatures for adequate carbon monoxide removal.

As previously discussed, a system controller (or multiple controllers) can be configured and calibrated to accomplish these objectives. For example, an exemplary method under the invention could include the following steps:

modulating an air blower according to a first control signal to flow air through a cathode of a fuel cell;

modulating a fuel blower according to a second control signal to flow fuel through a fuel processing reactor to produce reformate, the fuel blower further motivating flow of the reformate from the fuel processing reactor to an anode of a fuel cell;

combining air exhausted from the fuel cell cathode with reformate exhausted from the fuel cell anode to form a combined stream, and flowing the combined stream through an oxidizer;

operating an oxygen sensor to measure an amount of oxygen in an oxidizer exhaust, and communicating an oxygen signal to a controller;

operating the controller in response to the oxygen signal to increase an output of the air blower to maintain an oxygen fraction of the oxidizer exhaust above a predetermined oxygen threshold;

operating a temperature sensor to measure an oxidizer temperature, and communicating a temperature signal to the controller; and operating the controller in response to the temperature signal to increase an output of the fuel blower to maintain the oxidizer temperature below a predetermined temperature threshold.

Such a method could further include any of the aforementioned features, either alone or in combination. As a further example, another exemplary method under the invention could include the following steps:

flowing a fuel flow through a first electrode of a fuel cell to an oxidizer;

modulating a rate of oxidant flow through a second electrode of the fuel cell in response to an oxygen sensor contacting an exhaust flow of the oxidizer; and modulating a rate of the fuel flow in response to a temperature sensor contacting the exhaust flow of the oxidizer.

Yet another example includes a related method including the following steps:

flowing a fuel flow through a first electrode of a fuel cell to an oxidizer;

modulating a rate of first oxidant flow through a second electrode of the fuel cell in response to a first oxygen sensor contacting an exhaust flow of the oxidizer;

modulating a rate of the fuel flow in response to a temperature sensor contacting the exhaust flow of the oxidizer; and modulating a rate of second oxidant flow through the oxidixer in response to a second oxygen sensor contacting the exhaust flow of the oxidizer.

Such methods could also include any of the steps or features previously discussed, either alone or in combination.

While the invention has been disclosed with respect to a limited number of embodiments, those skilled in the art, having the benefit of this disclosure, will appreciate numerous modifications and variations therefrom. It is intended that the invention covers all such modifications and variations as fall within the true spirit and scope of the invention.

What is claimed is:

1. A fuel cell system, comprising:
   a fuel processing reactor adapted to receive a flow of fuel from a fuel source, the fuel processing reactor being further adapted to react the flow of fuel and provide reformate to an anode of a fuel cell stack;
   an air source adapted to provide a flow of air to a cathode of the fuel cell stack;
   an oxidizer adapted to receive and oxidize a flow of reformate from the anode of the fuel cell stack with a flow of air from the cathode of the fuel cell stack;
   an oxygen sensor adapted receive an exhaust flow from the oxidizer, the oxygen sensor being adapted to indicate a level of oxygen in the exhaust flow;
   a temperature sensor adapted to measure a temperature of the oxidizer;
   a controller connected to the fuel source and the temperature sensor, the controller being adapted to vary an output of the fuel source in response to a change in a signal received from the temperature sensor; and
   wherein the controller is further connected to the air source and the oxygen sensor, and the controller is adapted to vary an output of the air source in response to a change in a signal received from the oxygen sensor.

2. The fuel cell system of claim 1, further comprising a heat exchanger adapted to transfer heat from an exhaust of the oxidizer to a receiving stream.

3. The fuel cell system of claim 2, wherein the heat exchanger is adapted to transfer heat from the exhaust of the oxidizer to liquid water to generate steam, and wherein the system further comprising a conduit adapted to inject the steam into the fuel processing reactor.

4. The fuel cell system of claim 1, wherein the controller modulates the air source in response to the oxygen sensor to maintain a molar oxygen fraction in the oxidizer exhaust flow in the range 0.0–0.1.

5. The fuel cell system of claim 1, wherein the controller modulates the fuel source to maintain the oxidizer temperature below a predetermined level.

6. The fuel cell system of claim 5, wherein the predetermined level is 1,000° C.

7. The fuel cell system of claim 5, wherein the predetermined level is 500° C.

8. The fuel cell system of claim 1, wherein the controller is adapted to modulate the fuel source to maintain the oxidizer temperature less than 400° C. greater than the outlet temperature of the fuel cell stack.

9. The fuel cell system of claim 1, further comprising a voltage sensor adapted to measure a voltage of at least one fuel cell in the fuel cell stack.

10. The fuel cell system of claim 9, wherein the controller is adapted to modulate the flow of fuel from the fuel source to maintain the voltage above a predetermined level.

11. The fuel cell system of claim 10, wherein the controller is adapted to modulate the flow of fuel from the fuel source to maintain the oxidizer temperature above a predetermined level.

12. The fuel cell system of claim 1, further comprising a current sensor adapted to measure a current produced by the fuel cell stack.

13. The fuel cell system of claim 12, wherein the controller is adapted to modulate the flow of fuel from the fuel source in response to a signal from the current sensor.

14. The fuel cell system of claim 1, wherein the controller is adapted to modulate the flow of fuel from the fuel source to maintain the oxidizer temperature above a predetermined level.

15. The fuel cell system of claim 1, wherein the flow of air from the cathode of the fuel cell stack is injected into the oxidizer, and wherein the oxygen sensor is located along an exhaust conduit connected to the oxidizer.

16. The fuel cell system of claim 1, wherein the oxidizer temperature is an oxidizer exhaust temperature.

17. The fuel cell system of claim 1, wherein the oxidizer temperature is an oxidizer monolith temperature.

18. The fuel cell system of claim 1, wherein the fuel cell stack comprises polymer electrolyte membranes.

19. The fuel cell system of claim 1, wherein the air source is a blower.

20. The fuel cell system of claim 1, wherein the fuel source is a fuel blower.

21. The fuel cell system of claim 1, wherein the air source is a pressure vessel having a variable flow actuator, the flow actuator being responsive to a control signal from the controller.

22. The fuel cell system of claim 1, wherein the fuel source is a pressure vessel having a variable flow actuator, the flow actuator being responsive to a control signal from the controller.

23. A method of operating a fuel cell system, comprising:
   modulating an air blower according to a first control signal to flow air through a cathode of a fuel cell;
   modulating a fuel blower according to a second control signal to flow fuel through a fuel processing reactor to produce reformate, the fuel blower further motivating flow of the reformate from the fuel processing reactor to an anode of a fuel cell;

combining air exhausted from the fuel cell cathode with reformate exhausted from the fuel cell anode to form a combined stream, and flowing the combined stream through an oxidizer;

operating an oxygen sensor to measure an amount of oxygen in an oxidizer exhaust, and communicating an oxygen signal to a controller;

operating the controller in response to the oxygen signal to increase an output of the air blower to maintain an oxygen fraction of the oxidizer exhaust above a predetermined oxygen threshold;

operating a temperature sensor to measure an oxidizer temperature, and communicating a temperature signal to the controller; and operating the controller in response to the temperature signal to increase an output of the fuel blower to maintain the oxidizer temperature below a predetermined temperature threshold.

24. The method of claim 23, wherein the predetermined temperature threshold is 1000° C.

25. The method of claim 23, wherein the predetermined oxygen threshold is a molar oxygen fraction in the range 0.0–0.1.

26. The method of claim 23, further comprising:
transferring heat from the oxidizer to liquid water to generate steam; and
injecting the steam into the fuel processing reactor.

27. The method of claim 23, further comprising:
decreasing the flow of reformate from the fuel processor to increase the oxygen fraction of the oxidizer exhaust.

28. The method of claim 23, further comprising:
increasing the flow of reformate from the fuel processor to decrease the oxygen fraction of the oxidizer exhaust.

29. The method of claim 23, further comprising:
increasing an electrical load on the fuel cell to decrease the oxidizer temperature.

30. The method of claim 23, further comprising:
decreasing the flow of reformate from the fuel processor to decrease the oxidizer temperature.

31. The method of claim 23, further comprising:
decreasing an electrical load on the fuel cell to increase the oxidizer temperature.

32. The method of claim 23, further comprising:
increasing the flow of reformate from the fuel processor to increase the oxidizer temperature.

33. The method of claim 23, wherein the oxidizer temperature is an oxidizer exhaust temperature.

34. The method of claim 23, wherein the oxidizer temperature is an oxidizer monolith temperature.

35. The method of claim 23, further comprising:
determining whether a power demand on the fuel cell is met by an output from the fuel cell.

36. The method of claim 35, further comprising:
decreasing an output of the fuel blower during a period where the power demand is met.

37. The method of claim 35, further comprising:
decreasing an output of the air blower during a period where the power demand is met.

38. A method of operating a fuel cell system, comprising:
flowing a fuel flow through a first electrode of a fuel cell to an oxidizer;
modulating a rate of oxidant flow through a second electrode of the fuel cell in response to an oxygen sensor contacting an exhaust flow of the oxidizer; and
modulating a rate of the fuel flow in response to a temperature sensor contacting the exhaust flow of the oxidizer.

39. A method of operating a fuel cell system, comprising:
flowing a fuel flow through a first electrode of a fuel cell to an oxidizer;
modulating a rate of first oxidant flow through a second electrode of the fuel cell in response to a first oxygen sensor contacting an exhaust flow of the oxidizer;
modulating a rate of the fuel flow in response to a temperature sensor contacting the exhaust flow of the oxidizer; and
modulating a rate of second oxidant flow through the oxidizer in response to a second oxygen sensor contacting the exhaust flow of the oxidizer.

40. A reactant flow rate controller for a fuel cell system, comprising:
a fuel cell having an air electrode and a fuel electrode;
an air blower adapted to vary a flow of air through the air electrode of the fuel cell;
a fuel blower adapted to vary a flow of fuel through the fuel electrode of the fuel cell;
an oxidizer adapted to receive an exhaust flow from the fuel electrode of the fuel cell, the oxidizer being further adapted to receive an air flow, the oxidizer being further adapted to oxidize the exhaust flow from the fuel electrode and produce an oxidizer exhaust flow;
a temperature sensor adapted to measure an oxidizer temperature;
an oxygen sensor adapted to indicate a level of oxygen in the oxidizer exhaust flow;
a controller adapted to receive a temperature signal from the temperature sensor, the controller being further adapted to receive an oxygen signal from the oxygen sensor; and
wherein the controller is further adapted to modulate a first output of the air blower and a second output of the fuel blower.

* * * * *